United States Patent Office 2,806,773
Patented Sept. 17, 1957

2,806,773

AGRICULTURAL GRANULE

Gordon R. Pole, White Bear Township, Ramsey County, Minn., assignor to Minnesota Mining & Manufacturing Company, St. Paul, Minn., a corporation of Delaware No Drawing. Application November 18, 1953, Serial No. 393,005

8 Claims. (Cl. 71—64)

This invention relates generally to the application of uniformly controlled small but essential amounts of trace elements or the like to media enhanced by such additives, and to products adapted to such application. A specific example involves the uniformly controlled application of trace elements to large areas of the soil, wherein finely divided trace element materials are applied in the form of utilizable coatings on relatively massive, inert carrier components.

It is well known in the art that trace amounts of elements such as iron, manganese, boron, zinc, copper, molybdenum, iodine and cobalt are essential to the growth of plants. Moreover, it is also known that one species of plant often requires more of a particular element or elements within the aforementioned group than another species for best development. Also, particular fields, plots or areas may be robbed of the beneficial elements once present by repetitious growing of same or similar species of plantlife year after year. Or a particular area may be deficient in one or more of the beneficial elements desired because of an original lack thereof or exhaustion of those present by repetitious growing of plantlife desiring similar elements year after year. It is desirable, therefore, to be able to supplement soil with particular combinations and quantities of the trace elements.

Heretofore in the art, several methods for adding trace elements to the soil have been attempted with varying degrees of success. One such method has been to spray soluble salts of the needed elements over the soil and on the leaves of the plants growing therein. Another method is the application of various soluble metallic compounds to the soil and foliage as chelated complexes. Dusting has been used as a method for distributing beneficial materials to the soil.

Probably the most successful means for adding trace elements to the soil, heretofore known in the art, is the use of a powdery glassy frit prepared by dissolving compounds of the needed elements in a fused glassy matrix, crushing the material to a fine powder or dust and applying to the soil by spreading or drilling.

The frit must be ground to an extremely fine state in order to make the dispersed trace materials available to the soil due to the high insolubility of the frit. This extremely fine particle size results in considerable loss by drifting and dusting. Moreover, uniform distribution of the frit in the desired small amounts presents an application problem due to the highly concentrated form of the frit. Intermixing of the powdered frit with diluents such as soil, fertilizers, etc., so as to permit more uniform spreading is unsatisfactory because of the additional operations required.

Spraying of trace materials in soluble form, and application by dusting, have been found to be unsatisfactory means for applying trace elements to the soil because of the expense involved in application and losses of material. Further, when applied by some of the means heretofore employed, trace elements would not be available, over long periods, e. g., more than one growing season, in the controlled rates desired.

It is frequently found desirable to apply one or more trace elements in different forms; for example, a soluble component is desired to provide an immediate increase in concentration, and a much more slowly soluble component is desired to maintain the desired concentration over a number of growing seasons. However it is difficult if not impossible to incorporate such widely differing forms of trace element materials in a single glassy matrix. Furthermore some forms of trace element materials do not lend themselves to successful incorporation in any fused or glassy matrix. For example, a compound cannot practically be incorporated into the aforementioned fused frit in the elemental form or any heat-unstable form. During the high temperature fusing operation the elemental metals tend to settle out of the molten glass and the heat-unstable compounds are converted to a form undesirable for some uses.

The principal objects and advantages of my invention lie in the provision of an improved article of manufacture, viz., agricultural granules, as a means for controllably adding to the soil needed trace elements. My agricultural granules may be manufactured with a wide variety of selections and combinations of the trace materials permitting satisfaction of the local or regional need; yet the varied combination of trace elements may be obtained without substantial change in processing. The trace elements may be incorporated in the elemental or heat-unstable form allowing maximum versatility for varied situations.

Another object of my new and novel invention is to permit availability of the trace elements to the soil and plants growing therein over a period of more than one year. Still another object of the present invention is to reduce to a minimum the danger of overdosing plants, and to allow the plantlife to assimilate the trace elements in the desired amount and at a most effective but not excessive rate.

Another object of the present invention is to provide a means for suitable distribution of small amounts of trace materials in a form that may be easily handled.

Still another object of the present invention is to permit the trace element materials to be spread uniformly in small amounts over large areas without the necessity of intermixing or diluting with dirt, fertilizers or other additives, although blending with other additives to permit addition of all in a single application is of course feasible.

Still another object of my invention is to permit addition of trace elements to the soil without irritation or harm to animals or humans through inhalation of dusts or volatiles.

Another object of my invention is to provide a trace element carrier which may be manufactured and applied to the soil more efficiently and economically than trace element additives heretofore known in the art.

A further object of my invention is to be able to incorporate into my agricultural granule trace element materials of any desired form without destruction or degradation of any physical or chemical properties essential to the function of the granule and its uses.

The objects and advantages above set forth, as well as others, will be apparent from the specification taken as a whole, including the appended claims.

My invention especially concerns a means for adding to the soil trace elements in varied amounts and combinations, thereby being suitable for specific locales, farms, or fields and the like and involving an agricultural granule carrier medium. Upon exposure of my agricaural granules to soil solutions, the trace elements are released from the granule in a soluble form over a period of time, generally up to a period of several growing seasons.

By incorporating different types of binders with my varied types and combinations of trace element materials, I am able to utilize materials at hand in the preparation and manufacture of my granule most expeditiously. Where it is desired to utilize a binder material insoluble in water and only slowly reactive to soil solutions, I use as my trace materials those which quickly solubilize. Thus as the trace element materials slowly come to be subjected to the action of soil solution as a result of dilatory degradation of the binder, the liberated portion of the trace materials quickly dissolve in soil solutions with a resulting slow liberation of trace elements over an extended period of time.

On the other hand, where I desire to use rather slowly soluble trace element materials, I then utilize a water-soluble binding material so as to quickly liberate the trace element materials to the soil and to permit continued slow action upon the materials by soil solutions, again liberating trace elements over a lengthy period at the rate desired. However the binder material employed in the manufacture of my agricultural granules must be of a film-forming nature and of itself have physical properties such that the binder will not be easily broken down by mutual abrasion of the granules during normal handling prior to their application to the soil.

Therefore having indicated in a general way the nature and purpose of my invention, the following examples will illustrate the same. In the examples, the ingredients are given in parts by weight unless otherwise indicated.

*Example I*

| | Parts |
|---|---|
| Greystone granules (#18 grade) (—10+48 mesh) | 1775 |
| Sodium silicate solution (8.9% Na₂O, 28.7% SiO₂) | 160 |
| Water | 25 |
| Manganese carbonate powder | 40 |
| Iron powder | 32 |
| Zinc dust | 26 |
| Copper dust | 26 |
| Magnesium borate powder | 38 |
| Sodium molybdate powder | 2 |

The sodium silicate solution and water are added to a rotating drum-type mixer containing the greystone granules pre-heated to a temperature of 180° F. After the granules, sodium silicate and water have been intimately mixed, the trace element materials, viz., the manganese carbonate, iron powder, zinc dust, copper dust, magnesium borate, and sodium molybdate are added to the mixer.

When added in this manner, the trace element materials become uniformly and intimately embedded in the tacky, partially dried silicate coating, and thus are adherently attached to the granule. Air is passed at room temperature through the tumbling granules for approximately five minutes to further dry the coating, leaving the granules in a non-tacky and free-flowing state. The granules are then discharged into a surge bin, from which they are fed to a kiln and heated to a temperature of 800-900° F. The agricultural granules are then gradually cooled in a rotary cooler, by water spray followed by counter-flowing air, to a temperature of 90-100° F.

The minimum size coated granules will pass a standard 48 mesh screen but will not pass a standard 60 mesh screen. When granules of a size less than this are spread, they tend to dust and to be easily displaced and blown by winds. The granules may be as large as practicability in a given situation permits, in some cases up to about ⅜ inch in size.

Base granules of a size smaller than 60 mesh may be utilized in the present invention by agglomerating the smaller base particles with an adhesive binder such as is employed in adhering the trace materials to the base granule. Fine sand, brick dust and other fine materials are adaptable to such use. This agglomerate may then be coated in a manner similar to that set forth herein. Other types of natural inorganic mineral base granules which may be used are sand, syenite, felsite, diabase, trap rock or other similar types of material. The inorganic water insoluble inert binder adheres the trace element materials to the surface of the granule. The action of soil solutions leaches the trace element materials from the granule.

The product will be seen to contain a total of 189 parts of trace element materials, providing 124 parts of the trace elements per se, based on the 1775 parts of greystone granules, i. e. 7.1 percent of the weight of the base granules. In general, at least about 2 percent of trace elements based on the weight of the base granules is required in my agricultural granules. At less than this amount the weight of granules required per unit area of soil to be treated is excessive and uneconomical. Much greater amounts may be added, to the point where presence of additional coating materials would initiate coalescence of the mass. In all cases the base granule comprises at least a major proportion of the total weight.

Although the agricultural granules as herein described are designed primarily for use in soil treatment, the application of the same principle to other agricultural purposes is also contemplated. For example, coated granules comprising antibiotic or vitamin additives, as well as mineral supplement materials, provide numerous advantages when used as poultry-grit. For this purpose grit up to about ⅜ inch is suggested for turkeys, and smaller grit for smaller fowl. If so used it is to be understood that abrasive-resistant binder as meant herein connotates abrasive-resistant to normal handling since it is well known that turkey grits are pulverized by the abrasive action within the fowl. Such a use of my invention would probably function primarily due to the physical breaking of the binder, thus allowing the trace materials to be subjected to the digestive processes of the turkey.

The binder must be present in great enough amount such that all the trace element materials will be sufficiently strongly adherently attached to the granule so that no appreciable amount of the trace materials will be worn off by mutual abrasion of the granules while they are being handled. The amounts specified in the preceding example provide approximately 61 parts of the dried silicate binder per 189 parts of trace element materials.

*Example II*

| | Parts |
|---|---|
| Greystone granules #18 grade | 1750 |
| Portland cement (high early strength type) | 110 |
| Calcium chloride powdered | 2 |
| Water | 90 |
| Manganese dioxide powdered | 35 |
| Fe₂O₃, hydrated powdered | 37 |
| Zinc sulfide powdered | 39 |
| Copper dust | 26 |

The Portland cement, calcium chloride and water are added to a rotating drum-type mixer containing the 180° F. preheated greystone granules. The previously weighed trace element materials are added and tumbled as described in Example I. The granules are then cured in a closed container until the cement has reached final strength, i. e., about 24 hours at high humidity.

In the granule of this example an inorganic, water insoluble, permeable or reactive type binder is employed. Upon application of the agricultural granules to the soil, soil solutions will break down or permeate the coating, and the trace element materials will be leached therefrom. The trace materials further will be attacked chemically by the soil solutions and be rendered soluble by the same. Various oxysulfate cements and similar film-forming, abrasive-resistant materials are suitable as a binder.

*Example III*

|   | Parts |
|---|---|
| Sodium silicate solution (19.5% $Na_2O$, 31.2% $SiO_2$) | 81 |
| Water | 16 |
| Manganese dioxide powder | 20 |
| Zinc dust | 7 |
| Zinc borate powder | 18 |
| Copper dust | 14 |
| Molybdic acid powder | 2 |
| Iron powder ($H_2$ reduced) | 20 |
| Crushed brick granules | 1880 |

The sodium silicate and water are added to a mixing tank equipped with a high-speed propeller-type agitator. The previously weighed trace element materials, magnesium dioxide, copper dust, and iron powder, are added to the mixer containing the silicate and water and the mixture is thoroughly mixed and added to a rotary drum-type mixer containing the 180° F. pre-heated crushed brick granules. Air at room temperature is passed through the mixer to dry the coated granules to a free flowing state. After about 5 minutes of tumble mixing the partially dried agricultural granules are discharged into a surge bin from which the granules are fed to a rotary kiln where they are progressively heated to 350–380° F. The granules are then cooled by counter-flowing air in a rotary cooler.

The granule of this example employs a water-soluble inorganic film coated on the base granule. Upon distribution of the granules to the soil, the trace element materials are made available when the binder is dissolved by soil solutions.

The base granule of this example is of crushed and classified brick. Other crushed and classified artificial materials such as waste slags, cements and other like product and by-product materials may be used as granules. Organic resins such as phenol-formaldehyde, urea-formaldehyde or reacted epoxy are also applicable to the present invention.

*Example IV*

|   | Parts |
|---|---|
| Epoxy resin | 85 |
| Dibutyl phthalate | 15 |
| Diethylenetriamine | 5 |
| Greystone granules | 1800 |
| Manganese dioxide powder | 40 |
| Zinc dust | 38 |
| Copper dust | 38 |

The epoxy resin, in this case a reaction product of bisphenol A and epichlorohydrin having a melting point of 97–103° C. and an epoxide equivalent of 905–985, together with the dibutyl phthalate and diethylenetriamine are stirred and intimately mixed at 225° F. and the low viscosity, watery-like fluid is added to a drum-type mixer containing the 220° F., pre-heated #18 grade greystone granules and the mixture is tumbled until intimately mixed during which time the granules are uniformly thinly coated with the water-like binder. The trace materials, manganese dioxide, zinc dust and copper dust are added to the mixture and tumbled with the thinly-coated granules for several minutes, as in previous examples. The tumbling continues until the binder is "set" and the resultant coated granules are free flowing.

The organic water insoluble chemically inert binder adheres the trace materials to the surface of the granules, allowing soil solutions to leach trace elements slowly therefrom upon distribution to the soil. Other insoluble resinous materials, e. g. urea-formaldehyde, phenol-formaldehyde, may alternatively be utilized as the binder by this method.

*Example V*

|   | Parts |
|---|---|
| Polymethyl acrylate emulsion (60% solids) | 160 |
| Water | 10 |
| Quartz granules | 1805 |
| Manganese dioxide | 20 |
| $Fe_2O_3$, hydrated | 32 |
| Copper dust | 14 |
| Zinc dust | 16 |
| Magnesium borate | 14 |
| Molybdic acid | 2 |
| Cobalt carbonate | 2 |

The polymethyl acrylate emulsion and 10 parts of water are added to a mixing tank provided with a high speed agitator. Added thereto are previously weighed amounts of trace element materials, viz., manganese dioxide, iron oxide, copper dust, zinc dust, magnesium borate, molybdic acid and cobalt carbonate, all in powdered form. The mixture is agitated for three minutes and then discharged into a rotating drum-type mixer containing 160° F. pre-heated #18 grade quartz granules. Hot air at 180° F. is passed through the drum-type mixer for about 10 minutes, drying the granules to a free flowing state. The agricultural granules are then discharged into a surge bin and subsequently fed into a rotary cooler where the tumbling granules are cooled by counter-flowing air.

The granules prepared in this manner employ a water insoluble organic binder which is reactive or permeable to the action of soil solutions whereby the coating is degraded or broken down in a manner allowing the said solutions to leach the trace materials from the granule. Others porous or degradable film-forming organic materials such as other polyester type resinous materials, insoluble starches and gums are also applicable to the present example of my invention:

*Example VI*

|   | Parts |
|---|---|
| Ground corncobs | 1500 |
| Dextrine-borax aqueous adhesive (46% solids) | 400 |
| Water | 150 |
| Manganese dioxide powder | 68 |
| $Fe_2O_3$, hydrated powder | 68 |
| Zinc dust | 56 |
| Copper dust | 56 |
| $2CaO.3B_2O_3.5H_2O$ powder | 77 |
| Molybdic acid C.P. powder | 4 |

The dextrine-borax adhesive solution and water are added to the ground, classified 3–28 mesh corncobs along with the previously weighed manganese dioxide, hydrated iron oxide, zinc dust, copper dust, $2CaO.3B_2O_3.5H_2O$ (colemanite) and molybdic acid, in the manner described and illustrated in Example V with an agricultural granule resulting therefrom having an organic water-soluble film-forming binder. The organic inanimate type base granule employed in this type of granule may be sawdust or other similar product or by-product material.

The trace components of the examples described above are seen to be finely divided powders. The particles of the trace materials are always small when compared to the base granule and, as can be readily seen, the rate of reaction of a given trace material with soil solutions will vary with varying particle size.

I have herein described and set forth my invention of a trace element carrying granule, and the preparation and application thereof and have illustrated the same by reference to specific examples. It is to be understood that I am not to be limited, in the scope of my invention, by the specific examples but rather the invention is to be interpreted as having the scope defined in the following claims.

What I claim is as follows:

1. A method of uniformly controllably applying finely divided trace element materials to media positively affected thereby, which method involves applying to said media a plurality of free-flowing coated granules, each granule comprising a small non-dusting inanimate carrier base granule having an adherent coating over the surface thereof, said coating including finely divided trace element materials as one constituent uniformly dispersed throughout a tack-free non-hydroscopic abrasive-resistant film-forming binder as a second constituent, one of said coating constituents being essentially insoluble in water, said base granule having a size of at least about 60 mesh and comprising a major proportion of the coated granule, said binder being present in an amount permitting handling of a mass of the coated granules without substantial chalking and without substantially wearing away the coating by mutual abrasion of the granules, said trace element materials further being available to action by soil solutions, and at least slowly soluble in ionic form in said solutions, the trace elements of said finely divided trace element materials being present in an amount of at least about 2% by weight of the coated granule, the resulting coated granule being substantially non-hydroscopic and of a size of at least about 48 mesh.

2. Free-flowing agricultural granules suitable for controllably adding trace amounts of growth promoting components to growth media, said granules comprising a small non-dusting inanimate carrier base granule having an adherent coating over the surface thereof, said coating including finely divided trace element materials as one constituent uniformly dispersed throughout a tack-free non-hygroscopic abrasive-resistant film-forming binder as a second constituent, one of said coating constituents being essentially insoluble in water, said base granule having a size of at least about 60 mesh and comprising a major proportion of the coated granule, said binder being present in an amount permitting handling of a mass of the coated granules without substantial chalking and without substantially wearing away the coating by mutual abrasion of the granules, said trace element materials further being available to action by soil solutions, and at least slowly soluble in ionic form in said solutions, the resulting coated granule being of a size of at least about 48 mesh.

3. Free-flowing agricultural granules suitable for controllably adding trace elements to media positively affected thereby, said granules comprising a small non-dusting inanimate carrier base granule having an adherent coating over the surface thereof, said coating including finely divided trace element materials as one constituent uniformly dispersed throughout a tack-free non-hygroscopic abrasive-resistant film-forming binder as a second constituent, one of said coating constituents being essentially insoluble in water, said base granule having a size of at least about 60 mesh and comprising a major proportion of the coated granule, said binder being present in an amount permitting handling of a mass of the coated granules without substantial chalking and without substantially wearing away the coating by mutual abrasion of the granules, said trace element materials further being available to action by soil solutions, and at least slowly soluble in ionic form in said solutions, the trace elements of said finely divided trace element materials being present in an amount of at least about 2% by weight of the coated granule, the resulting coated granule being of a size of at least about 48 mesh.

4. As an improved article of manufacture, an agricultural granule suitable for preventing and correcting soil deficiencies through controlled addition of needed trace elements to the soil, a plurality of said granules being free-flowing and capable of being spread uniformly under field conditions substantially without local concentration or loss by drifting and dusting and free from physiological effects to animals and humans through inherent toxicity, said agricultural granule comprising a small non-dusting inanimate carrier base granule having an adherent coating over the surface thereof, said coating including finely divided water-insoluble trace element materials uniformly dispersed throughout a tack-free water-soluble non-hygroscopic abrasive-resistant film-forming binder, said base granule having a size of at least about 60 mesh and comprising a major proportion of the coated granule, said binder being present in an amount permitting handling of a mass of the coated granules without substantial chalking and without substantially wearing away the coating by mutual abrasion of the granules, said trace element materials further being available to action by soil solutions, and at least slowly soluble in ionic form in said solutions, the trace elements of said finely divided trace element materials being present in an amount of at least about 2% by weight of the coated granule, the resulting coated granule being of a size of at least about 48 mesh.

5. The agricultural granules of claim 2 in which said trace element materials in each granule contain more than a single trace element.

6. The agricultural granules of claim 3 in which said binder is insoluble in water.

7. The agricultural granules of claim 6 in which said binder comprises sodium silicate.

8. The agricultural granule of claim 4 in which said binder comprises soluble sodium silicate.

References Cited in the file of this patent

UNITED STATES PATENTS

| | | |
|---|---|---|
| 847,749 | Ellis | Mar. 19, 1907 |
| 959,841 | Carpenter | May 31, 1910 |
| 1,316,396 | Snelling | Sept. 16, 1919 |
| 1,399,660 | Saves | Dec. 6, 1921 |
| 1,966,947 | Eyer | July 17, 1934 |
| 2,008,469 | Prince | July 16, 1935 |
| 2,030,461 | Moss | Feb. 11, 1936 |
| 2,280,451 | Riddle | Apr. 21, 1942 |